(12) United States Patent
McQuillen et al.

(10) Patent No.: US 8,386,638 B2
(45) Date of Patent: *Feb. 26, 2013

(54) SYSTEMS AND METHODS FOR ADAPTIVE COMMUNICATION CONTROL

(75) Inventors: Tim McQuillen, Redwood City, CA (US); Tulsi Ram Mayala, Newark, CA (US)

(73) Assignee: StrongMail Systems, Inc., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,698

(22) Filed: Apr. 30, 2012

(65) Prior Publication Data

US 2012/0221658 A1 Aug. 30, 2012

Related U.S. Application Data

(63) Continuation of application No. 12/758,797, filed on Apr. 12, 2010, now Pat. No. 8,171,159, which is a continuation of application No. 11/975,884, filed on Oct. 22, 2007, now Pat. No. 7,698,462.

(51) Int. Cl.
*G06F 15/82* (2006.01)
(52) U.S. Cl. ......... 709/238; 709/205; 709/206; 709/207
(58) Field of Classification Search .................. 709/238, 709/201–207, 217–219, 227–229
See application file for complete search history.

(56) References Cited

U.S. PATENT DOCUMENTS

| | | | |
|---|---|---|---|
| 5,937,162 A | 8/1999 | Funk et al. | |
| 6,519,471 B1 | 2/2003 | Yamaguchi | |
| 6,526,436 B1 | 2/2003 | Shiraishi et al. | |
| 6,577,860 B1 | 6/2003 | Yoshida | |
| 6,850,968 B1 | 2/2005 | Pfeffer et al. | |
| 7,536,439 B1 * | 5/2009 | Jaladanki et al. | 709/206 |
| 7,672,998 B1 * | 3/2010 | Haskins et al. | 709/206 |
| 2002/0120705 A1 | 8/2002 | Schiavone et al. | |
| 2003/0018727 A1 | 1/2003 | Yamamoto | |
| 2003/0018728 A1 | 1/2003 | Kaneta et al. | |

(Continued)

FOREIGN PATENT DOCUMENTS

| | | |
|---|---|---|
| EP | 0 491 367 A2 | 6/1992 |
| EP | 1 298 872 A2 | 4/2003 |

(Continued)

OTHER PUBLICATIONS

International Search Report and Written Opinion for International Application PCT/US2005/019223 dated Sep. 5, 2006.

(Continued)

*Primary Examiner* — Ruolei Zong
(74) *Attorney, Agent, or Firm* — Morgan, Lewis & Bockius LLP

(57) ABSTRACT

Computer program products, apparatus, and methods for processing digital messages to recipients at destination domains is provided. A plurality of profiles are established, each profile for handling digital to a specific domain or set of domains. A request to process a plurality of outbound digital messages is handled by, for each given digital message, processing the given digital message by (i) determining a destination domain for digital messages, (ii) reading a profile for the determined destination domain for the digital messages and (iii) based on at least one parameter set in the profile: (a) sending the given digital message to the determined destination domain in accordance with the profile when permitted by the at least one parameter set in the profile, or (b) not sending the digital message to the determined destination domain when required by the at least one parameter set in the profile.

13 Claims, 4 Drawing Sheets

U.S. PATENT DOCUMENTS

| | | | |
|---|---|---|---|
| 2003/0028580 A1 | 2/2003 | Kucherawy et al. | |
| 2003/0135573 A1 | 7/2003 | Taylor | |
| 2004/0199595 A1* | 10/2004 | Banister et al. | 709/207 |
| 2006/0053200 A1 | 3/2006 | McCown | |
| 2006/0059238 A1* | 3/2006 | Slater et al. | 709/206 |
| 2006/0129592 A1 | 6/2006 | Poozhiyil et al. | |

FOREIGN PATENT DOCUMENTS

| | | |
|---|---|---|
| WO | WO 02/13470 | 2/2002 |

OTHER PUBLICATIONS

Process Software, LLC, "PMDF System Manager's Guide" Online, XP-002244814, Sep. 2001; pp. 33-1-33-7.

SuperSpeed Software Inc. White Paper: "Increasing Performance in the Mission Critical Environment", XP-002244815, Nov. 29, 2001, pp. 1-12.

Request for Comments 1939, Post Office Protocol Version 3, May 1996.

Request for Comments 2821, Simple Mail Transfer Protocol, Apr. 2001.

Siddiqui et al, (2003) "Incorporating Dynamic Behavior in SMTP" IEEE: 1293-1297.

"Simple Mail Protocol (SMTP)," Handbook of Information Security, Chapter 60, John Wiley & Sons, New York, Dec. 2005.

Tzerefos et al., (1997) "A Comparative Study of Simple Mail Transfer Protocol (SMTP), Post Office Protocol (POP) and X.400 Electronic Mail Protocols," IEEE: 545-554.

* cited by examiner

SYSTEMS AND METHODS FOR ADAPTIVE COMMUNICATION CONTROL

CROSS-REFERENCE TO RELATED APPLICATIONS

This application is a continuation of U.S. application Ser. No. 12/758,797 filed on Apr. 12, 2010, which claims priority to U.S. application Ser. No. 11/975,884 filed Oct. 22, 2007, now U.S. Pat. No. 7,698,462, which are hereby incorporated by reference in their entirety for all purposes.

1. FIELD OF THE INVENTION

Systems and methods for controlling delivery of digital messages are provided. More particularly, computer systems and methods for customizing digital message forwarding parameters, on a domain by domain basis, are provided.

2. BACKGROUND OF THE INVENTION

Digital message (e.g., e-mail, text messages, etc.) is an essential network service. Many digital messaging systems that send digital messages over the Internet use protocols such as simple mail transfer protocol (SMTP), in the case of E-mail, and other protocols when the digital message is other than e-mail, to send digital messages from one server to another. The messages can then be retrieved with a client using services such as post office protocol (POP) or Internet message access protocol (IMAP). Other protocols for sending digital messages that are e-mails include, but are not limited to, POP3, X.400 International Telecommunication Union standard (X.400), and the Novell message handling service (MHS), and extended simple mail transfer protocol (ESMTP). Specifically, X.400 defines a transfer protocol for sending electronic mail between mail servers and is used in Europe as an alternative to SMTP. MHS, which was developed by Novell, is used for electronic mail on Netware networks.

SMTP transports digital messages among different hosts within the transmission control protocol/Internet protocol (TCP/IP) suite. Under SMTP, a client SMTP process opens a TCP connection to a server SMTP process on a remote host and attempts to send mail across the connection. The server SMTP listens for a TCP connection on a specific port, usually port 25, and the client SMTP process initiates a connection on that port. When the TCP connection is successful, the two processes execute a simple request-response dialogue, defined by the SMTP protocol (see RFC 821 STD 10, simple mail transfer protocol, August 1982, for details), in which the client process transmits the mail addresses of the originator and the recipient(s) for a message. When the server process accepts these mail addresses, the client process transmits the e-mail instant message. The e-mail message contains a message header and message text ("body") formatted in accordance with RFC 822 (RFC822 STD 11, Standard for the format of ARPA—Internet Text Messages, August 1982). Mail that arrives via SMTP is forwarded to a remote server or it is delivered to mailboxes on the local server. On UNIX-based systems, Sendmail is a widely used SMTP server for e-mail. Sendmail includes a POP3 server and also comes in a version for Windows NT. Microsoft Outlook is the most popular mail-agent program on Window-based systems. Similar protocols are used when the digital message is other than e-mail.

The SMTP model (RFC 821) supports both end-to-end (no intermediate message transfer agents "MTAs") and store-and-forward mail delivery methods. The end-to-end method is used between organizations, and the store-and-forward method is chosen for operating within organizations that have TCP/IP and SMTP-based networks. A SMTP client will contact the destination host's SMTP server directly to deliver the mail. It will keep the mail item from being transmitted until it has been successfully copied to the recipient's SMTP. This is different from the store-and-forward principle that is common in many other electronic mailing systems, where the mail item may pass through a number of intermediate hosts in the same network on its way to the destination and where successful transmission from the sender only indicates that the mail item has reached the first intermediate hop. The RFC 821 standard defines a client-server protocol. The client SMTP is the one which initiates the session (that is, the sending SMTP) and the server is the one that responds (the receiving SMTP) to the session request. Because the client SMTP frequently acts as a server for a user-mailing program, however, it is often simpler to refer to the client as the sender-SMTP and to the server as the receiver-SMTP. A SMTP-based process can transfer electronic mail to another process on the same network or to another network via a relay or gateway process accessible to both networks. An e-mail message may pass through a number of intermediate relay or gateway hosts on its path from a sender to a recipient.

A simple model of the components of the SMTP system is shown in FIG. 1. Systems that send digital messages other than e-mail have similar components. Referring to FIG. 1, users deal with a user agent (UA). Popular user agents for UNIX include Berkeley Mail, Elm, MH, Pine, and Mutt. The user agents for Windows include Microsoft Outlook/Outlook Express and Netscape/Mozilla Communicator. The exchange of e-mail using, for example TCP, is performed by an MTA. One MTA for UNIX systems is Sendmail, and a conventional MTA for Windows is Microsoft Exchange Server 2007. Users normally do not deal with the MTA. It is the responsibility of the system administrator to set up the local MTA. Users often have a choice, however, for their user agent. The local MTA maintains a mail queue so that it can schedule repeat delivery attempts in case a remote server is unable. Also the local MTA delivers mail to mailboxes, and the information can be downloaded by the UA (see FIG. 1). The RFC 821 standard specifies the SMTP protocol, which is a mechanism of communication between two MTAs across a single TCP connection. The RFC 822 standard specifies the format of the electronic mail message that is transmitted using the SMTP protocol (RFC 821) between the two MTAs. As a result of a user mail request, the sender-SMTP establishes a two-way connection with a receiver-SMTP. The receiver-SMTP can be either the ultimate destination or an intermediate one (known as a mail gateway). The sender-SMTP will generate commands, which are replied to by the receiver-SMTP (see FIG. 1).

A typical e-mail delivery process is as follows. Delivery processes for digital messages other than e-mail follow similar scenarios. In the following scenario, Larry at terminal 102 sends e-mail to Martha at her e-mail address: martha@example.org. Martha can review here e-mail at terminal 102. Martha's Internet Service Provider (ISP) uses mail transfer agent MTA 106.

1. Larry composes the message and chooses send using mail user agent (MUA) 108. The e-mail message itself specifies one or more intended recipients (e.g., destination e-mail addresses), a subject heading, and a message body; optionally, the message may specify accompanying attachments.

2. MUA 108 queries a DNS server (not shown) for the IP address of the local mail server running MTA 110. The DNS server translates the domain name into an IP address, e.g., 10.1.1.1, of the local mail server.

3. User agent 108 opens an SMTP connection to the local mail server running MTA 110. The message is transmitted to the local mail server using the SMTP protocol. An MTA (also called a mail server, or a mail exchange server in the context of the Domain Name System) is a computer program or software agent that transfers electronic mail messages from one computer to another. Webster's New World Computer Dictionary, tenth edition, Wiley Publishing Inc., Indianapolis, Ind., defines an MTA as an e-mail program that sends e-mail messages to another message transfer agent. An MTA can handle large amounts of mail, can interact with databases in many formats, and has extensive knowledge of the many SMTP variants in use. Examples of high-throughput MTA systems are disclosed in U.S. patent application Ser. No. 10/857,601, entitled "Email Delivery System Using Metadata," filed May 27, 2004 as well as U.S. patent application Ser. No. 10/777,336, entitled "Email Using Queues in Nonpersistent memory," filed Feb. 11, 2004, each of which is hereby incorporated by reference in its entirety. One example of an MTA system is the StrongMail MTA (Redwood Shores, Calif.). Conventional MTA programs include, but are not limited to, Sendmail, qmail, Exim, Postfix, Microsoft Exchange Server, IMail (Ipswitch, Inc.), MDaemon (Alt-N Technologies), MailEnable, Merak Mail Server, and qmail.

4. MTA 110 queries a DNS server (not shown) for the MX record of the destination domain, e.g., example.org. The DNS server returns a hostname, e.g., mail.example.org. MTA 110 queries a DNS server (not shown) for the A record of mail.example.org, e.g., the IP address. The DNS server returns an IP address of, for example, 127.118.10.3.5. MTA 110 opens an SMTP connection to the remote mail server providing e-mail service for example.org which is also running MTA 106. The message is transmitted to MTA 106 from MTA 110 using the SMTP protocol over a TCP connection.

5. MTA 106 delivers Larry's message for Martha to the local delivery agent 112. Local delivery agent 112 appends the message to Martha's mailbox. For example, the message may be stored in (e.g., using a sample file path on a UNIX system): /var/spool/mail/martha.

6. Martha has her user agent 114 connect to her ISP. Martha's user agent 114 opens a POP3 (Post Office Protocol version 3, defined in RFC1725) connection with the POP3 (incoming mail) server 112. User agent 114 downloads Martha's new messages, including the message from Larry.

7. Martha reads Larry's message.

The MTA 110, which is responsible for queuing up messages and arranging for their distribution, is the workhorse component of electronic mail systems. The MTA "listens" for incoming e-mail messages on the SMTP port, which is generally port 25. When an e-mail message is detected, it handles the message according to configuration settings, that is, the settings chosen by the system administrator, in accordance with relevant standards such as Request for Comment documents (RFCs). Typically, the mail server or MTA must temporarily store incoming and outgoing messages in a queue, the "mail queue." Actual queue size is highly dependent on one's system resources and daily volumes.

In some instances, referring to FIG. 2, communication between a sending host (client) and a receiving host (server), could involve relaying. In addition to one MTA at the sender site and one at the receiving site, other MTAs, acting as client or server, can relay the electronic mail across the network. This scenario of communication between the sender and the receiver can be accomplished through the use of a digital message gateway, which is a relay MTA that can receive digital messages prepared by a protocol other than SMTP and transform it to the SMTP format before sending it. The digital message gateway can also receive digital messages in the SMTP format, change it to another format, and then send it to the MTA of the client that does not use the TCP/IP protocol suite. In various implementations, there is the capability to exchange mail between the TCP/IP SMTP mailing system and the locally used mailing systems. These applications are called digital message gateways or mail bridges. Sending digital messages (e.g., e-mail) through a digital message gateway may alter the end-to-end delivery specification, because SMTP will only guarantee delivery to the mail-gateway host, not to the real destination host, which is located beyond the TCP/IP network. When a digital message gateway is used, the SMTP end-to-end transmission is host-to-gateway, gateway-to-host or gateway-to-gateway; the behavior beyond the gateway is not defined by SMTP.

While functional, existing digital message sending systems, such as MTAs, are unsatisfactory. Digital messages (e.g., e-mail) sent to a given domain (e.g., a particular ISP) or site may be blocked. However, typically, the blocking domain will either not specify why the digital message was blocked or will provide incomplete information as to why the message was blocked. In one example, the reason why a domain will block incoming digital messages is that a digital message quota, where the quota is based for example on a number of allowed digital messages per unit of time (e.g., per day, per week, per month) from the sending domain has been exceeded. However, the conventional sending digital messaging sending system (e.g., MTA 110 of FIG. 1) does not learn that a quota has been exceeded from the message failure notices that are returned to the sending MTA by the blocking domain. So the digital message sending system continues to resend the blocked digital messages and send any new additional digital messages (e.g., e-mail, text messages, etc.) in its queue to the blocking domain even though there is no chance that the blocking domain will accept the resent digital messages or the new digital messages from the digital message sending system because the quota has been exceeded. In another example, the receiving domain may be down because of equipment failure or scheduled maintenance. The digital message sending system may send digital messages to the receiving domain and meet with failure. But the digital message sending system will continue to resend the digital message and any new digital message in its queue to the receiving domain on some predetermined retry basis without intelligently backing off from its efforts to send out the digital message to the domain that is down.

Given the above background, what is needed in the art are improved systems and methods for sending out digital message to domains using, for example, MTAs or other forms of digital message sending systems that communicate digital messages to end users.

Discussion or citation of a reference herein will not be construed as an admission that such reference is prior to the present invention.

3. SUMMARY OF THE INVENTION

The present invention addresses many of the shortcomings and drawbacks found in the prior art. In the present invention, feedback loops are provided in which the domains (or sites) to which digital messages (e.g., e-mail) are sent by a message transfer agent (MTA), or other form of digital message sending system that communicates digital messages to end-users, report back to the MTA or other form of digital message system, providing domain level and/or site or client specific digital message policy details. This information is used to build a profile for each domain or set of domains (or site or set of sites) to which the MTA or other form of digital message sending system (e.g., server) sends digital messages. For example, prior to sending a digital messages to a domain or particular site, the MTA or other form of digital message sending system consults the profile associated with the domain or site, or the set of domains or sites that includes the domain or site, to ensure that the MTA or other form of digital message sending system sends the digital message to the domain or site in a manner that is compliant with the incoming digital message policy of the domain or site. The MTA or other form of digital message sending system may further set up monitoring rules that are periodically checked to see if a condition with respect to digital message (e.g., e-mail) sent to given domain or site has taken place. If the condition has taken place, such as a number of connection time outs to the given domain or site or spam blocks from the given domain or site in a specific time period, then the profile for the given domain or site is updated with an action, such as to defer further digital messages to the domain or site or to declare the domain or site inactive. In this way, the MTA or other form of digital message sending system does not waste valuable resources sending digital messages to domains or sites that will reject the digital messages (e.g., e-mails). The MTA or other form of digital message sending system uses the profiles to dynamically customize its digital message sending for each domain so that the MTA or other form of digital message sending system sends digital messages to such domains or sites in compliance with any digital message policies imposed by such domains or sites.

One aspect of the invention provides a digital message (e.g., e-mail) system that has a method for processing a plurality of digital messages (e.g., e-mail messages, text messages, etc.) that are being sent to recipients at a plurality of destination domains or sites. The method comprises establishing a plurality of profiles in the system. Each profile in the plurality of profiles is for handling digital messages bound to a specific domain or set of domains in the plurality of destination domains (or a specific site or set of sites in a plurality of destination sites). A request is received at the system to process for transfer a plurality of outbound e-mail messages. Each digital message specifies delivery to at least one recipient at a particular domain or set of domains (and/or a particular site or set of sites). As used herein, the term "site" can, for example, mean a specific uniform resource location (URL) a particular phone number, or any other form of uniquely identifying electronic address. For each given digital message, processing of the given digital message is accomplished by determining a destination domain or site for the given digital message and then reading a profile, in the plurality of profiles, for the determined destination domain for the given digital message or for a set of destination domains that includes the determined destination domain for the given digital message. Based on at least one parameter set in the profile, the given digital message is sent to the determined destination domain (or site) in accordance with the profile when permitted by the at least one parameter set in the profile. Alternatively, the given digital message is held without sending the digital message to the determined destination domain when required by the at least one parameter set in the profile.

In some embodiments, the method further comprises receiving a message notification from the determined destination domain in response to the sending of the given digital message to the determined destination domain (or site) by the digital message system. Then, the profile for the determined destination domain or for the set of destination domains that includes the determined destination domain is updated in response to the message notification. In some embodiments, the message notification is a delivery failure notification indicating that the given digital was not delivered to the determined destination domain. In such instances, the updating step comprises updating the profile for the determined destination domain or for the set of destination domains that includes the determined destination domain to postpone delivery of any digital from the digital system to the determined destination domain (or site) or the set of destination domains (or set of sites) that includes the determined destination domain for a period of time.

In some embodiments, the determined destination domain to which the digital message is sent is an Internet Service Provider (ISP). In some embodiments, the method further comprise receiving automatically, without user intervention, a periodic report from the ISP regarding compliance with a digital message delivery policy for the ISP. This report establishes whether the digital message system complied with the digital message delivery policy for the ISP during a period of time covered by the periodic report. In such instances, the method further comprises modifying automatically, without user intervention, the profile in the plurality of profiles corresponding to the ISP when the digital message system has not complied with the digital message delivery policy for the ISP so that the digital message system will be compliant with the digital message delivery policy. In some embodiments, the periodic report comprises (i) an indication of a first number of digital messages the system attempted to send to the ISP during a period of time encompassed by the periodic report and (ii) a number of digital messages in the first number of digital messages that were blocked by the ISP during the period of time encompassed by the periodic report or a number of digital messages in the first number of digital messages that were successfully received by the ISP and forwarded to users of the ISP during the period of time encompassed by the periodic report In some embodiments, the digital delivery policy of the ISP comprises a quota on a number of digital messages and/or a maximum amount of data that may be sent from the digital message system to the ISP during a predetermined period of time and the modifying step comprises updating one or more parameters in the profile corresponding to the ISP so that the digital message system complies with the quota.

In some embodiments, the profile in the plurality of profiles corresponding to the determined destination domain comprises (i) a connection time out period such that, when the digital message system attempts to establish contact with the determined destination domain in order to deliver a digital message and connection is not established within the connection time out period, the delivery of the digital message is deemed to have failed, (ii) a maximum number of attempts parameter that determines a number of times the digital message system will attempt to deliver a digital message to the determined destination domain before permanently aborting any attempt to deliver the digital message to the determined destination domain, and (iii) a maximum number of outgoing messages parameter that determines a number of digital messages the digital message system can deliver to the determined destination domain in a given period of time such that, when the digital message system has delivered the maximum number of outgoing messages to the determined destination domain, the digital message system will deliver no more digital messages to the determined destination domain until the period of time represented by the maximum number of outgoing messages parameter has expired.

In some embodiments, the method further comprises automatically receiving an update, without user intervention, of one or more profiles in the plurality of profiles from an external system. In some embodiments, the update alters one or more parameters in each of the one or more profiles thereby affecting how the digital message system sends digital messages to the domain (or site) or the set of domains (or set of sites) associated with each of the one or more profiles and the update is generated by receiving digital message policy updates from each of the domains (or sites) or sets of domains (or sets of sites) associated with each of the one more profiles.

In some embodiments, the method further comprises monitoring digital message sent to the determined destination to determine whether a condition is satisfied and, when the condition is satisfied, updating the profile for the determined destination, in the plurality of profiles, to include one or more actions corresponding to the condition.

In some instances, the condition is a number of time outs that occurred during a predetermined evaluation interval and the action is a requirement that all digital messages bound for the determined destination be deferred. In such instances, the monitoring step comprises evaluating, each time a period of time equal to the predetermined evaluation interval has elapsed, a number of times during the latest predetermined evaluation interval that the digital message system failed to deliver a digital message to the determined destination domain. When the number of times the digital message system failed to deliver a digital message to the determined destination domain exceeds a maximum allowable number of time outs, the profile for the determined destination is updated to include a deferral requirement that specifies that all further digital messages from the digital message system to the determined destination domain be deferred. When the number of times the digital message system failed to deliver a digital message to the determined destination domain does not exceed a maximum allowable number of time outs and digital messages to the determined destination domain has not been deferred during the latest predetermined evaluation interval, the profile for the determined destination is not updated to include a deferral requirement that specifies that all further digital messages from the digital message system to the determined destination domain (or determined site) are to be deferred. In some embodiments, when a predetermined period of time has elapsed and the profile for the determined destination domain specifies that digital messages from the digital message system to the determined destination domain (or site) is to be deferred, the method further comprises updating the profile for the determined destination to remove the deferral requirement so that the digital message system can resume sending digital messages to the determined destination domain (or determined site).

In some embodiments, the condition is a number of spam block notifications sent from the determined destination domain to the digital message system that occurred during a predetermined evaluation interval and the action is an indication that the determined destination be deemed dormant. In such instances, the monitoring step comprises evaluating, each time a period of time equal to the predetermined evaluation interval has elapsed, a number of times a spam block notification was received from the determined destination domain (or site) during the latest predetermined evaluation interval indicating that a digital message sent to the determined destination domain was spam. When the number of times a span block notification was received exceeds a maximum allowable number of span block notifications, the profile for the determined destination is updated to include a dormant indication that specifies that all further digital messages from the digital message system to the determined destination domain not be sent.

In some embodiments, the condition is message delivery failure rate of a predetermined evaluation interval and the action is a requirement that all digital messages bound for the determined destination be deferred. In such instances, the monitoring step comprises evaluating, each time a period of time equal to the predetermined evaluation interval has elapsed, the message delivery failure rate during the latest predetermined evaluation interval for digital messages sent to the determined destination domain (or site) by the digital message system. When the message delivery failure rate exceeds a maximum allowable message delivery failure rate, the profile for the determined destination (or site) is updated to include a deferral requirement that specifies that all further digital messages from the digital message system to the determined destination domain be deferred. When the message delivery failure rate does not exceed the maximum allowable message delivery failure rate, and digital messages to the determined destination domain has not been deferred during the latest predetermined evaluation interval, the profile for the determined destination is not updated to include a deferral requirement that specifies that all further digital messages from the digital message system to the determined destination domain be deferred. In some instances, when a predetermined period of time has elapsed and the profile for the determined destination domain (or site) specifies that digital messages from the digital message system to the determined destination domain (or site) is to be deferred, the method further comprises updating the profile for the determined destination (or site) to remove the deferral requirement so that the digital message system can resume sending digital messages to the determined destination domain (or site).

Another aspect of the present invention provides a computer program product for use in conjunction with a computer system. The computer program product comprises a computer readable storage medium and a computer program mechanism embedded therein. The computer program mechanism is for processing a plurality of digital messages that are being sent to recipients at a plurality of destination domains. The computer program mechanism comprises instructions for establishing a plurality of profiles, wherein each profile in the plurality of profiles is for handling digital messages to a specific domain or set of domains in the plurality of destination domains. The computer program mechanism further comprises receiving a request to process for transfer a plurality of outbound digital messages, each digital message specifying delivery to at least one recipient at a particular domain or set of domains. The computer program mechanism further comprises, for each given digital message, processing the given digital message by determining a destination domain for the given digital message and reading a profile, in the plurality of profiles, for the determined destination domain for the given digital message or for a set of destination domains that includes the determined destination domain for the given digital message. Based on at least one parameter set in the profile the computer program mechanism either (i) sends the given digital message to the determined destination domain in accordance with the profile when permitted by the at least one parameter set in the profile, or (ii) holds the given digital message without sending the digital message to the determined destination domain when required by the at least one parameter set in the profile.

In some embodiments, the computer program mechanism further comprises instructions for receiving a message notification from the determined destination domain in response to the sending of the given digital message to the determined destination domain by the digital message system and updates the profile for the determined destination domain or for the set of destination domains that includes the determined destination domain in response to the message notification. In some embodiments, the message notification is a delivery failure notification indicating that the given digital message was not delivered to the determined destination domain and the updating step comprises updating the profile for the determined destination domain or for the set of destination domains that includes the determined destination domain to postpone delivery of any digital message to the determined destination domain or the set of destination domains that includes the determined destination domain for a period of time.

In some embodiments, the determined destination domain is an Internet Service Provider (ISP). In some embodiments, the computer program mechanism further comprises instructions for receiving automatically, without user intervention, a periodic report from the ISP regarding compliance with a digital message delivery policy for the ISP, where the report establishes whether the computer program product complied with the digital message delivery policy for the ISP during a period of time covered by the periodic report. Then, the profile in the plurality of profiles corresponding to the ISP is modified automatically, without user intervention, when the digital message system has not complied with the digital message delivery policy for the ISP so that the computer program product will be compliant with the digital message delivery policy.

Another aspect of the present invention provides a computer system for processing a plurality of digital messages that are being sent to recipients at a plurality of destination domains. The computer system comprises a central processing unit and a memory, coupled to the central processing unit. The memory comprises instructions for establishing a plurality of profiles, where each profile in the plurality of profiles is for handling digital message to a specific domain (or specific site) or set of domains (or set of specific sites) in the plurality of destination domains, and receiving a request to process for transfer a plurality of outbound digital messages, each digital message specifying delivery to at least one recipient at a particular domain or set of domains. For each given digital message, the memory comprises instructions for processing the given digital message by determining a destination domain for the given digital message and reading a profile, in the plurality of profiles, for the determined destination domain for the given digital message or for a set of destination domains that includes the determined destination domain for the given digital message. Based on at least one parameter set in the profile, the given digital message is sent to the determined destination domain in accordance with the profile when permitted by the at least one parameter set in the profile or the given digital message is held without sending the digital message to the determined destination domain when required by the at least one parameter set in the profile.

4. BRIEF DESCRIPTION OF THE DRAWINGS

Like reference numerals refer to corresponding parts throughout the several views of the drawings.

5. DETAILED DESCRIPTION

The present invention is directed to a digital message server (e.g., a mail transfer agent (MTA)) (or plurality of servers) that keeps a profile for each domain (or site) or set of domains (or set of sites) to which the server (or plurality of servers) routinely sends digital messages such as e-mail. Each respective profile contains one or more parameters that dictate the conditions under which digital messages can be sent to the domain (or site) associated with the respective profile (e.g., number of e-mails per day, etc.). The digital message server provides digital message service using any available electronic means such as, for example, SMTP, POP3, X.400, ESMTP or MHS protocol or a logical variant thereof (e.g., a program similar to or derived from SMTP, POP3, X.400, ESMTP or MHS). For a general reference regarding digital message protocols, see Hughes, 1998, *Internet E-mail: Protocols, Standards, and Implementation*, Artech House Publishers, which is hereby incorporated herein by reference herein in its entirety. Upon receipt of the digital messages, the digital message server determines destination domain (or site) for the digital message. The digital message server then reads the profile for the destination domain (or site) and determines what rules apply for sending the digital message (e.g. e-mail) to the destination domain (or site). If permitted by the profile, the digital message server sends the digital message to the destination domain. The digital message server further monitors progress sending digital message to destination domains (or destination sites). Periodically, the digital message server analyzes this progress to determine if certain domain specific conditions are being satisfied as defined in the domain specific (or site specific) profiles. In some embodiments, destination domains (or destination sites) periodically send reports (e.g., "report cards") back to the digital message server reporting on outcome of the digital message sent to such destination domains during a given period (e.g., how many digital messages were sent, how many digital messages were rejected, etc.). This information is used to refine the parameters in the profiles for these destination domains (or destination sites).

Figure 1:
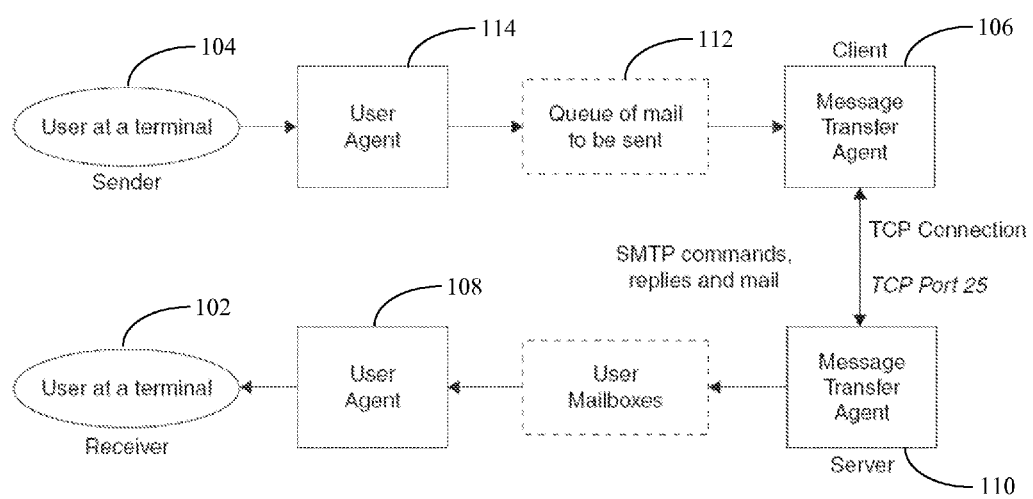
FIG. 1 is the basic simple mail transfer protocol (SMTP) model in accordance with the prior art.
Figure 2:
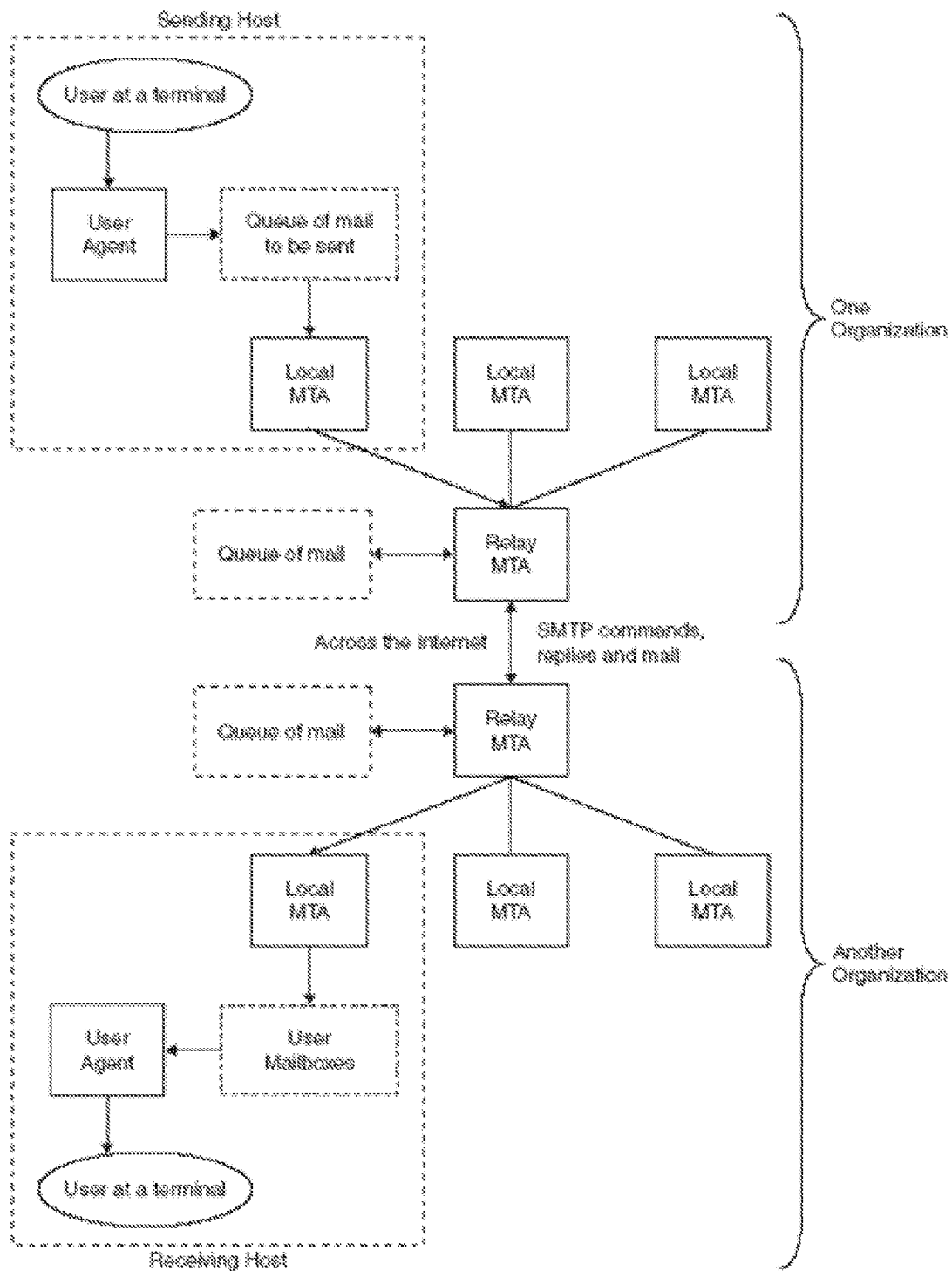
FIG. 2 is the simple mail transfer protocol (SMTP) model with relay mail transfer agents in accordance with the prior art.
Figure 3:
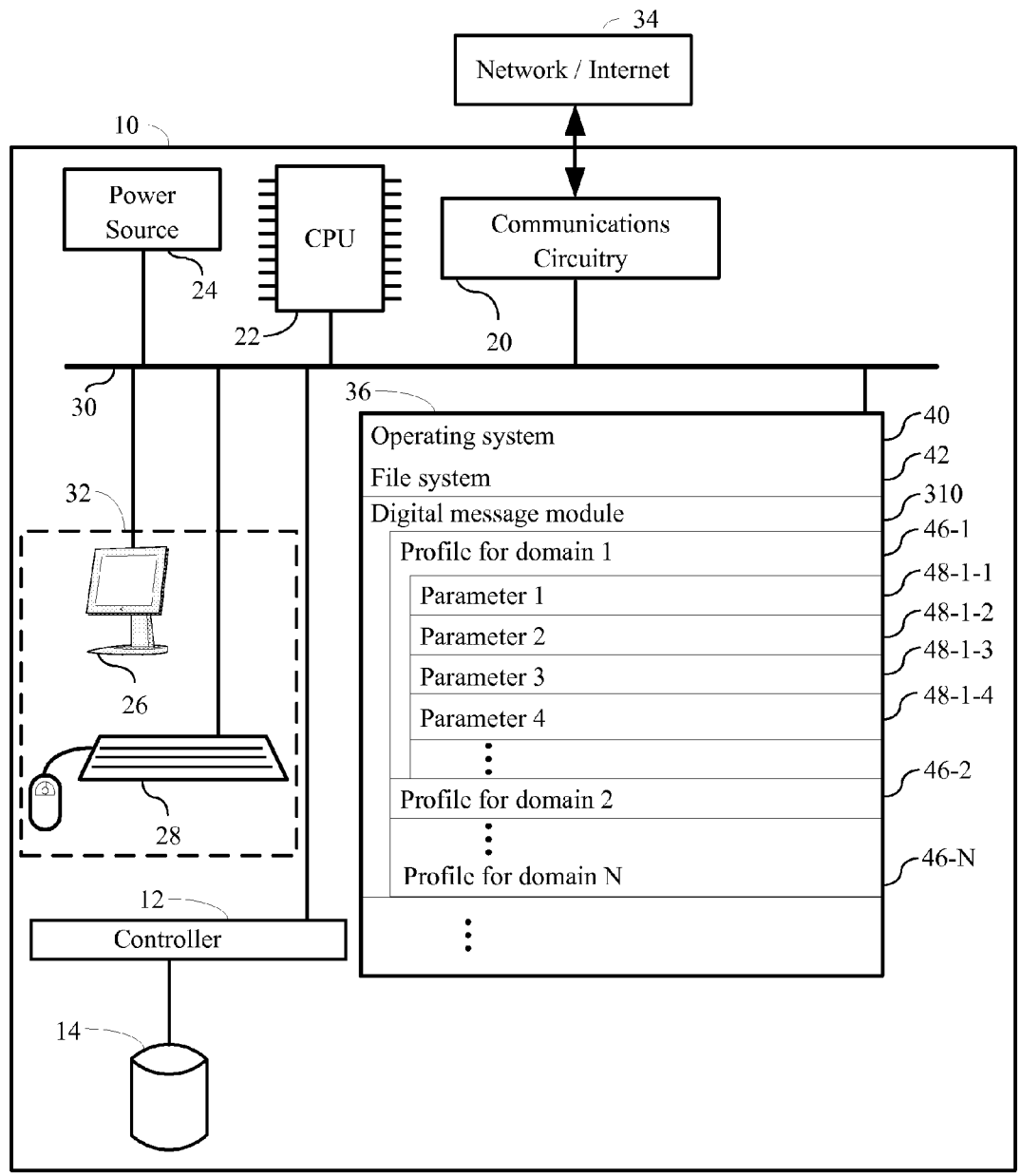
FIG. 3 is a server for sending digital messages (e.g., message transfer agent) in accordance with an embodiment with the present invention.

FIG. 3 details an exemplary system that supports the functionality described above. The system is preferably a computer system 10 having:

- a central processing unit 22;
- a main non-volatile storage unit 14, for example, a hard disk drive, for storing software and data, the storage unit 14 controlled by controller 12;
- a system memory 36, preferably high speed random-access memory (RAM), for storing system control programs, data, and application programs, comprising programs and data loaded from non-volatile storage unit 14; system memory 36 may also include read-only memory (ROM);
- a user interface 32, comprising one or more input devices (e.g., keyboard 28) and a display 26 or other output device;

a network interface card 20 or other communication circuitry for connecting to any wired or wireless communication network 34 (e.g., the Internet or any other wide area network);

an internal bus 30 for interconnecting the aforementioned elements of the system; and a power source 24 to power the aforementioned elements.

Operation of computer 10 is controlled primarily by operating system 40, which is executed by central processing unit 22. Operating system 40 can be stored in system memory 36. In addition to operating system 40, in a typical implementation, system memory 36 can include one or more of the following:

file system 42 for controlling access to the various files and data structures;

a digital message (e.g. transfer agent (MTA)) module 310 for processing a plurality of digital (e.g., e-mail) messages that are being sent to recipients at a plurality of destination domains (or sites); and a profile 46 for each receiving domain (or site) or set of receiving domains (or set of sites) to which the MTA digital message module 310 sends digital messages.

As illustrated in FIG. 3, computer 10 comprises software program modules and data structures. The data structures stored in computer 10 include, for example, profiles 46 for each receiving domain or set of receiving domains to which digital message module 310 sends digital messages. Each of these data structures can comprise any form of data storage including, but not limited to, a flat ASCII or binary file, an Excel spreadsheet, a relational database (SQL), or an on-line analytical processing (OLAP) database (MDX and/or variants thereof). In some embodiments, each of the profiles 46 are stored within a single data structure. In other embodiments, such profile 46, in fact, comprise a plurality of data structures (e.g., databases, files, archives) that may or may not all be hosted by computer 10. For example, in some embodiments, profiles 46 comprise a plurality of structured and/or unstructured data records that are stored either on computer 10 and/or on computers that are addressable by computer 10 across network/Internet 34.

In some embodiments, the one or more profiles 46 are in a database that is either stored on computer 10 or is distributed across one or more computers that are addressable by computer 10 by network/Internet 34. Thus, in some embodiments, one or more of such data structures is hosted by one or more remote computers (not shown). Such remote computers can be located in a remote location or in the same room or the same building as computer 10. As such, any arrangement of the data structures and software modules illustrated in FIG. 3 on one or more computers is within the scope of the present invention so long as these data structures and software modules are addressable by computer 10 across network/Internet 34 or by other electronic means. Moreover, other systems, application modules and databases not shown in FIG. 3 can be stored in system memory 36. Thus, the present invention fully encompasses a broad array of computer systems. Moreover, computer 10 may in fact comprise a plurality of servers that are in electrical communication with each other and that each contain one or more of the software modules and/or data structures illustrated in FIG. 3.

Each profile 46 includes one or more parameters 48 that dictate the incoming digital message policy of a particular domain (or site) or set of domains (or set of sites). In some embodiments, the domain or set of domains associated with a profile 46 is an Internet Service Provider. Examples of param eters that may be stored in the profile 46 for a given domain include, but are not limited to:

a connection time out period such that, when digital message module 310 attempts to establish contact with a destination domain corresponding to the profile 46 in order to deliver a digital message (e.g., an E-mail) and connection is not established within the connection time out period, the delivery of the digital message is deemed to have failed;

a maximum number of attempts parameter that determines a number of times the digital message module 310 will attempt to deliver a digital message to the destination domain (or destination site) corresponding to the profile 46 before permanently aborting any attempt to deliver the digital message to the destination domain; and a maximum number of outgoing messages parameter that determines a number of digital messages the digital message module 310 can deliver to the determined destination domain (or determined destination site) in a given period of time (e.g., an hour, a day, a week, a month) such that, when the digital message module 310 has delivered the maximum number of outgoing messages to the destination domain (or site) corresponding to the profile 46, the digital message module 310 will deliver no more digital messages to the destination domain (or destination site) until the period of time represented by the maximum number of outgoing messages parameter has expired.

Additional examples of parameters include, but are not limited to:

```
Action=DEFER
RetryUnverifiedMessages=ON
ConnectionTimeOut=30
ConnectionTimeOutData=300
MaxAttempts=3
DeferDNSFailures=ON
UseARecord=ON
MaxIdleConnectionTimeout=25
MaxOutgoingMessagesPerMin=5
```

Figure 4:
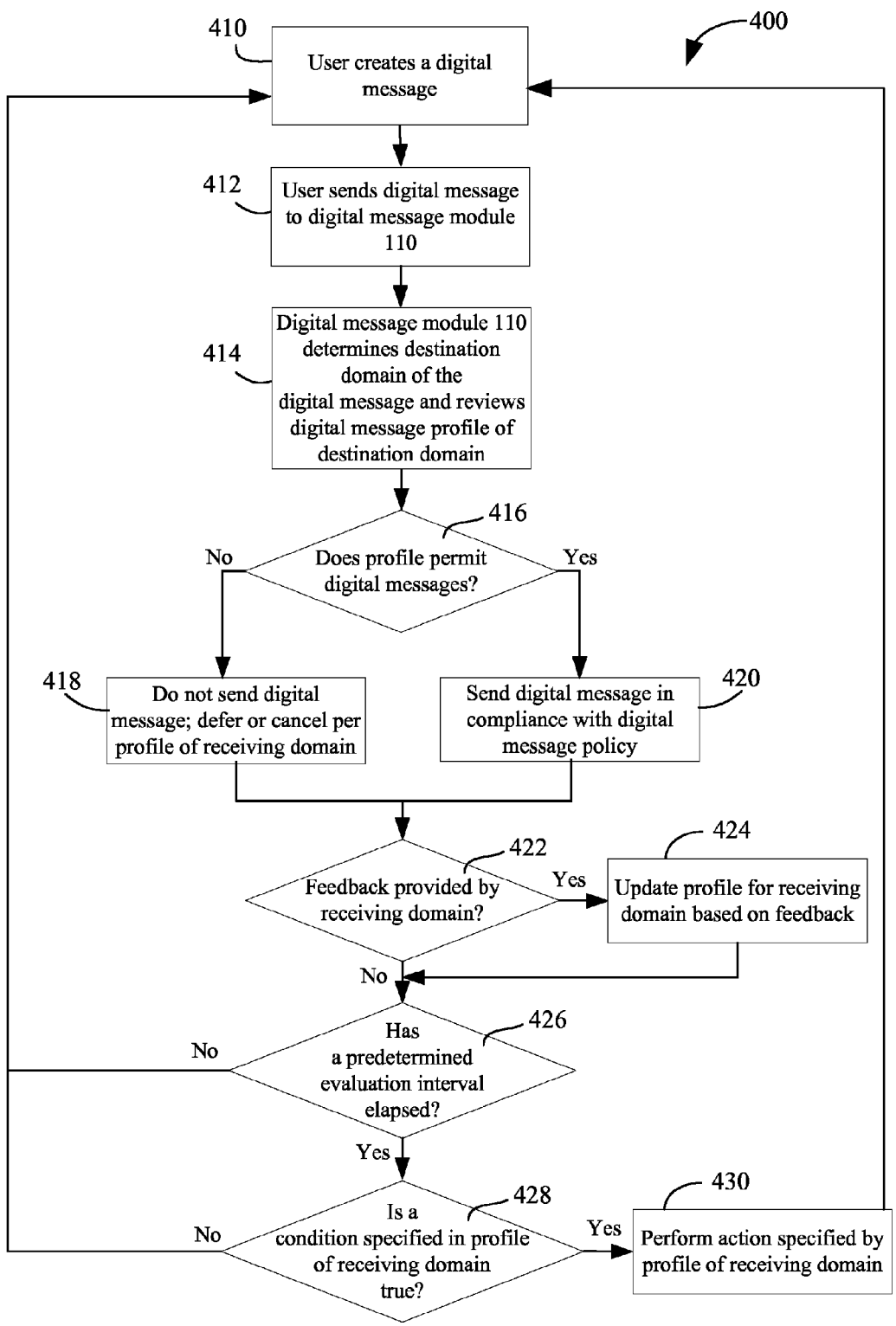
FIG. 4 is a flowchart that depicts processing steps that are taken to ensure that digital messages sent by a digital message server (e.g., message transfer agent) in accordance with the incoming digital message requirements of one or more receiving domains or sites.

Now that an overview of a system in accordance with one embodiment of the present invention has been described, various advantageous methods that can be used in accordance with the present invention will now be disclosed in conjunction with FIGS. 3 and 4. In particular, FIG. 4 provides a general overview of a method 400 for sending digital messages to intended recipients.

In step 410, a user creates a digital message. This digital message can include text, markup language (e.g., HTML, WML, BHTML, RDF/XML, RSS, MathML, XHTML, SVG, cXML or XML), or other scripts or objects. In step 412, the user sends the digital message to digital message module 310. In step 414, digital message module 310 determines the destination domain of the digital message and identifies, based on this destination domain (or site), the profile 46 that corresponds to the destination domain (or site). In one example, the destination for the digital message is foo@aol.com. In such an example, digital message module 310 identifies the profile 46 for the domain aol.com. In some embodiments, a profile 46 is actually a profile for a set of related domains (or related sites), not just a single domain. A digital message to any one of the domains in the set of domains will cause the digital message module 310 to use the profile that includes the particular destination domain.

In step 416, the digital message module 310 makes a determination as to whether digital messages are permitted to the destination domain (or site). In some instances there is a dormant and/or delay parameter 48 within the profile 46 for the destination domain that specifies that no digital message is to be sent to the destination domain. In such a case (416-No) process control turns to step 418: the digital message is not sent or is differed in accordance with the instructions set forth in the profile of the receiving domain. In another example, there is a maximum incoming messages per minute parameter 48 in the profile 46 of the receiving domain. When such a parameter is encountered, the digital message module 310 checks to ensure that this maximum has not been exceeded. If it has (416-No), process control turns to step 418 and the digital message is not sent to the destination domain. In typical embodiments, if a digital message is not sent to the destination domain (steps 416-No, 418), then the digital message is returned to a message queue for later processing by the digital message module 310. In some embodiments, when the digital message module 310 has attempted to send the digital message a specific number of times (e.g., 3 times, 4 times, 10 times, 100 times) and each time an attempt to the send the digital message results in condition 416-No, the digital message is no longer returned to the queue and the user is notified of the message failure. In some instances the digital message module 310 has several digital message queues, one for each destination domain or set of destination domains.

If, in step 416, the profile 46 of the destination domain permits sending the digital message to the destination domain (step 416-Yes), than the digital message is sent in compliance with the one or parameters 48 of the digital message policy 46 of the destination domain.

Steps 418 and 420 effectively terminate a process for a given attempt to forward a digital message. The additional steps set forth in FIG. 4 (steps 422 through 430) can be performed concurrently to the aforementioned steps (steps 410 through 420) or not at all. Steps 422 through 430 will be described in further detail below. At this stage, a digital message module 310 for processing a plurality of digital messages that are being sent to recipients at a plurality of destination domains has been described. The method comprises establishing a plurality of profiles 46 (e.g., 10 or more profiles, 100 or more profiles, 1000 or more profiles, or $1 \times 10^6$ or more profiles) in the system 10. Each profile in the plurality of profiles is for handling digital message to a specific domain (or site) or set of domains (or set of sites) in a plurality of destination domains. A request is received at the system to process for transfer a plurality of outbound e-mail messages. This request may be a periodic request or it may simply be a request from a single user agent to forward one or more digital messages to one or more recipients. Each digital message specifies delivery to at least one recipient at a particular domain or set of domains. For each given digital message, processing of the given digital message is accomplished by determining a destination domain for the given digital message and then reading a profile 46, in the plurality of profiles, for the determined destination domain for the given digital message or for a set of destination domains that includes the determined destination domain for the given digital message. Based on at least one parameter set in the profile, the given digital message is sent to the determined destination domain in accordance with the profile when permitted by the at least one parameter set in the profile. Alternatively, the given digital message is held without sending the digital message to the determined destination domain when required by the at least one parameter set in the profile. For digital messages that include multiple destinations, steps 414 through 420 are run independently for each possible destination. That is, a profile 46 if read for each of the multiple domains and decisions (416-Yes or 416-No) are made for each of the multiple destination domains. The digital message is returned to queue when the digital is not sent to any given destination domain. However, when returned to queue, destinations to which the digital message was successfully sent are removed from the recipient list. For example, if the digital message was originally addressed to foo@aol.com foo2@yahoo.com and was successfully sent to foo@aol.com but not foo2@yahoo.com, the digital message is returned to queue with only the destination foo2@yahoo.com.

In step 422, a determination is made as to whether a receiving domain has provided any feedback. There is no requirement that step 422 occur after steps 418 or 420 as depicted in FIG. 4. The depiction of step 422 after steps 418 or 420 in FIG. 4 is merely to provide an illustration of the various aspects of the present invention in a logical and clear manner so that the many advantages of the present invention may be understood. In practice, steps 422 and 424 can be a separate process or thread that runs independently on computer 10 apart from any of the other steps illustrated in FIG. 4. The feedback provided by the receiving domain can be an electronic communication sent by a process on the receiving domain. Alternatively, the feedback can be in the form of manual instructions provided by an operator of the receiving domain to an operator of the digital message module 310. In step 424, the profile 46 for the receiving domain is updated based on the contents of the feedback provided in step 422.

In one embodiment illustrative of steps 422 and 424, a periodic report is received automatically, without user intervention, from a destination domain (e.g., an Internet Service Provider that uses the destination domain to receive incoming e-mail) regarding compliance with an e-mail delivery policy for the destination domain (e.g., the ISP), where the report establishes whether the digital message module 310 has complied with the digital message delivery policy for the ISP during a period of time covered by the periodic report. For example, the period of time covered by the report may be one week and the report would therefore cover the compliance of the digital message module 310 with the incoming digital message policy of the destination domain during the past week. In step 424 in accordance with this example, the profile for the destination domain is modified automatically, without user intervention, to comply with the update. For instance, when the digital message module 310 has not complied with the digital message delivery policy for the destination domain (perhaps because the module 310 has sent too many digital messages) so that the digital message module 310 will be compliant with the digital message delivery policy of the destination domain.

In one example, the periodic report comprises (i) an indication of a first number of digital messages that the digital message module 310 attempted to send to the destination domain (e.g. ISP) during a period of time encompassed by the periodic report, (ii) a number of digital messages in the first number of digital messages that were blocked by the destination domain during the period of time encompassed by the periodic report or a number of digital messages in the first number of digital messages that were successfully received by the destination domain and forwarded to users of the destination domain during the period of time encompassed by the periodic report. If the block rate (failure rate) is deemed to be too high by the digital message module 310, then the digital message module 310 may update a parameter 48 in the profile 46 of the receiving domain to either put a hold on outgoing digital messages for a period of time or to lower the limit of the number of digital messages that may be sent to the receiving domain in a given time period.

There is no requirement that the feedback provided by the receiving domain be sent on a periodic basis. In some instances, the feedback at step 422 is provided from a receiving domain on a purely ad hoc basis (e.g., a single time, every once in a while, only when a serious digital message transgression has taken place). The digital message module 310 can use ad hoc feedback to modify the profile associated with a receiving domain when such ad hoc feedback is received.

Like steps 422 and 424, there is no requirement that steps 426 through 430 be run after any of the foregoing steps. Indeed steps 426 through 430 can be a separate thread or process that runs independently of any other steps in FIG. 4. Moreover, there is no absolute requirement that process control return to step 410 after any of these steps have been completed. The purpose of steps 426 through 430 is to provide monitoring rules to monitor progress in sending digital messages to one or more destination domains. Indeed, at any given time there may be dozens or hundreds of monitoring processes each comprising steps 426 through 430 concurrently running in an instance of the digital message module 310 and each imposing a monitoring rule for a specific corresponding receiving domain or set of receiving domains.

In step 426, a determination is made as to whether a predetermined evaluation interval has transpired. If so (426-Yes), process control passes to step 428 where a condition specified in, for example the profile 46 of a given destination domain is evaluated.

In one example, the condition is a number of time outs that occurred during a predetermined evaluation interval and the action that is imposed in step 430 is a requirement that all digital messages bound for a determined destination be deferred. In this example, step 428 would comprise evaluating, each time a period of time equal to the predetermined evaluation interval has elapsed, a number of times during the latest predetermined evaluation interval that the digital message module 310 failed to deliver a digital message to a corresponding destination domain. In this example, when the number of times the digital message module 310 failed to deliver a digital message to the specific destination domain exceeds a maximum allowable number of time outs, the profile 46 for the specific destination is updated to include a deferral requirement that specifies that all further digital messages from the digital message module 310 to the specific destination domain be deferred. Further, in this example, when the number of times the digital message module 310 failed to deliver a digital message to the specific destination domain does not exceed a maximum allowable number of time outs and digital messages to the determined destination domain have not been deferred during the latest predetermined evaluation interval, the profile 46 for the specific destination is not updated to include a deferral requirement that specifies that all further digital messages from the digital message module 310 to the specific destination domain are to be deferred. In some instances, when a predetermined period of time has elapsed and the profile 46 for the specific destination domain specifies that digital messages from the digital message module 310 to the specific destination domain is to be deferred, the method further comprises updating the profile 46 for the specific destination domain to remove the deferral requirement so that the digital message module 310 system can resume sending digital messages to the specific destination domain.

In another example of steps 426 through 430, the condition is a number of spam block notifications sent from the specific destination domain to the digital message system that occurred during a predetermined evaluation interval and the action is an indication that the specific destination be deemed dormant. In such an example, step 428 comprises evaluating, each time a period of time equal to the predetermined evaluation interval has elapsed, a number of times a spam block notification was received from the determined destination domain during the latest predetermined evaluation interval indicating that a digital message sent to the specific destination domain was spam. Further, in step 430 in accordance with this example, when the number of times a span block notification was received exceeds a maximum allowable number of span block notifications, the profile 46 for the specific destination is updated to include a dormant indication that specifies that all further digital messages from the digital message module 310 to the specific destination domain (or site) not be sent.

In yet another example of steps 426 through 430, the condition is message delivery failure rate of a predetermined evaluation interval and the action is a requirement that all digital messages (e.g., e-mail) bound for the specific destination be deferred. A step 428 in accordance with this example comprises evaluating, each time a period of time equal to the predetermined evaluation interval has elapsed, the message delivery failure rate during the latest predetermined evaluation interval for digital messages sent to the specific destination domain by the digital message module 310. Further, an illustration of step 430 in accordance with this example requires that, when the message delivery failure rate exceeds a maximum allowable message delivery failure rate, the profile 46 for the determined destination be updated to include a deferral requirement that specifies that all further digital messages from the digital message module 310 to the determined destination domain be deferred and that when the message delivery failure rate does not exceed the maximum allowable message delivery failure rate, and digital messages to the specific (determined) destination domain has not been deferred during the latest predetermined evaluation interval, the profile 46 for the specific destination not be updated to include a deferral requirement that specifies that all further digital message from the digital message module 310 to the specific destination domain be deferred. In some instance, when a predetermined period of time has elapsed and the profile 46 for the specific destination domain specifies that digital messages from the digital message module 310 to the specific destination domain is to be deferred, the method further comprises updating the profile 46 for the specific destination to remove the deferral requirement so that the digital message module 310 can resume sending digital messages to the specific destination domain.

As in the case of steps 422 and 424, there is no absolute requirement that steps 426 through 430 occur periodically. A given condition (step 428) can be evaluated on an ad hoc basis or just a single time. Additional examples of monitoring rules that may be evaluated are as follows:

```
MonitorRule {
    EvaluationInterval=900
    Condition=(/strongmail/ConnectionsTimedout > 100),
    Action=DEFER,
            ConnectionTimeout=60
    Condition=(/strongmail/SpamBlocks > 10),
    State=DORMANT
}
```

The first condition monitors the number of connections that timed out and if the count exceeds 100, imposes the set Action=DEFER in the profile 46 for the domain and sets new connectionTimeout to 60. Similarly, the second condition checks whether there were more than ten spam blocks. If so, then it would mark the domain as dormant (not to be processed). In this example, these rules are evaluated every 900 seconds (15 minutes).

6. REFERENCES CITED

The present invention can be implemented as a computer program product that comprises a computer program mechanism embedded in a computer readable storage medium. For instance, the computer program product could contain the program modules shown in FIG. 3 or a program that embodies the flowchart illustrated in FIG. 4. These program modules can be stored on a CD-ROM, DVD, magnetic disk storage product, or any other computer readable data or program storage product. The program modules can also be embedded in permanent storage, such as ROM, one or more programmable chip, or one or more application specific integrated circuits (ASICs). Such permanent storage can be localized in a server, 802.11 access point, 802.11 wireless bridge/station, repeater, router, mobile phone, or other electronic devices. The software modules in the computer program product can also be distributed electronically, via the Internet or otherwise, by transmission of a computer data signal (in which the software modules are embedded) either digitally or on a carrier wave.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed:

1. A method of processing digital messages, comprising:
    on a digital message system having one or more processors and memory storing one or more programs for execution by the one or more processors:
        obtaining digital message policy information for a plurality of domains;
        determining a respective digital policy for each corresponding domain in the plurality of domains, wherein the digital message policy for each corresponding domain in the plurality of domains dictates a manner in which digital messages are to be sent to the corresponding domain;
        establishing a plurality of profiles wherein each respective profile in the plurality of profiles is for handling digital messages to an associated domain in the plurality of destination domains and wherein each respective profile in the plurality of profiles comprises a set of parameters at least one of which is specified by the digital policy of the associated domain;
        receiving, after the establishing, a request from a remote computer system to process for transfer a plurality of outbound digital messages, each outbound digital message in the plurality of outbound digital messages specifying delivery to at least one recipient at a particular domain; and
        for a respective outbound digital message in the plurality of outbound digital messages, processing the respective outbound digital message using the digital message system by:
            determining a destination domain for the respective outbound digital message
            reading a respective profile, in the plurality of profiles, associated with the determined destination domain of the respective outbound digital message and, based on at least one parameter in the respective profile:
                (i) sending the respective outbound digital message to the associated determined destination domain in accordance with the respective profile when permitted by the at least one parameter in the respective profile, or
                (ii) holding the respective outbound digital message without sending the respective outbound digital message to the determined destination domain when required by the at least one parameter in the respective profile.

2. The method of claim 1, further comprising:
    receiving a message notification from the determined destination domain in response to the sending of the respective outbound digital message to the determined destination domain by the digital message system; and
    updating the respective profile for the determined destination domain in response to the message notification.

3. The method of claim 2, wherein the message notification is a delivery failure notification indicating that the respective outbound digital message was not delivered to the determined destination domain and the updating step comprises:
    updating the respective profile for the determined destination domain to postpone delivery of any digital message from the digital message system to the determined destination domain for a period of time.

4. The method of claim 1, wherein the respective profile in the plurality of profiles corresponding to the determined destination domain further comprises:
    a connection time out period such that, when the digital message system attempts to establish contact with the determined destination domain in order to deliver a digital message and connection is not established within the connection time out period, the delivery of the digital message is deemed to have failed; and
    a maximum number of attempts parameter that determines a number of times the digital message system will attempt to deliver a digital message to the determined destination domain before permanently aborting any attempt to deliver the digital message to the determined destination domain.

5. The method of claim 1, the method further comprising:
    automatically obtaining an update, without user intervention, of one or more profiles in the plurality of profiles from an external system.

6. The method of claim 1, further comprising:
    monitoring digital messages sent to the determined destination domain to determine whether a condition is satisfied and, when the condition is satisfied, updating the profile for the determined destination domain, in the plurality of profiles, to include one or more actions corresponding to the condition.

7. The method of claim 6, wherein the condition is a number of time outs that occurred during a predetermined evaluation interval and the action is a requirement that all digital messages bound for the determined destination domain be deferred; wherein the monitoring comprises:
    evaluating, each time a period of time equal to the predetermined evaluation interval has elapsed, a number of times during the latest predetermined evaluation interval that the digital message system failed to deliver a digital message to the determined destination domain; and
    when the number of times the digital message system failed to deliver a digital message to the determined destination domain exceeds a maximum allowable number of time outs, the profile for the determined destination domain is updated to include a deferral requirement that specifies that all further digital messages from the digital message system to the determined destination domain be deferred; and when the number of times the digital message system failed to deliver a digital message to the determined destination domain does not exceed a maximum allowable number of time outs and digital messages to the determined destination domain has not been deferred during the latest predetermined evaluation interval, the profile for the determined destination domain is not updated to include a deferral requirement that specifies that all further digital messages from the digital message system to the determined destination domain are to be deferred.

8. The method of claim 7, wherein, when a predetermined period of time has elapsed and the respective profile for the determined destination domain specifies that digital messages from the digital message system to the determined destination domain is to be deferred, the method further comprises updating the profile for the determined destination domain to remove the deferral requirement so that the digital message system can resume sending digital messages to the determined destination domain.

9. The method of claim 6, wherein the condition is a number of spam block notifications sent from the determined destination domain to the digital message system that occurred during a predetermined evaluation interval and the action is an indication that the determined destination be deemed dormant; wherein the monitoring step comprises:

evaluating, each time a period of time equal to the predetermined evaluation interval has elapsed, a number of times a spam block notification was received from the determined destination domain during the latest predetermined evaluation interval indicating that a digital message sent to the determined destination domain was spam; and when the number of times a span block notification was received exceeds a maximum allowable number of span block notifications, the profile for the determined destination domain is updated to include a dormant indication that specifies that all further digital messages from the digital message system to the determined destination domain not be sent.

10. The method of claim 1, wherein for the respective profile, in the plurality of profiles, associated with the determined destination domain of the respective outbound digital message, the at least one parameter is specified by the originator of the digital message.

11. A digital message system, for processing digital messages, comprising:

one or more processors; and memory storing one or more programs to be executed by the one or more processors;

the one or more programs comprising instructions for:

obtaining digital message policy information for a plurality of domains;

determining a digital policy for each respective domain in the plurality of domains, wherein the digital message policy for each respective domain in the plurality of domains dictates a manner in which digital messages are to be sent to the respective domain;

establishing a plurality of profiles wherein each respective profile in the plurality of profiles is for handling digital messages to a corresponding domain in the plurality of destination domains and wherein each respective profile in the plurality of profiles comprises a set of parameters at least one of which is specified by the digital policy of the associated domain;

receiving, after the establishing, a request from a remote computer system to process for transfer a plurality of outbound digital messages, each outbound digital message in the plurality of outbound digital messages specifying delivery to at least one recipient at a particular domain; and for a respective outbound digital message in the plurality of outbound digital messages, processing the respective outbound digital message using the digital message system by:

determining a destination domain for the respective outbound digital message reading a respective profile, in the plurality of profiles, associated with the determined destination domain of the respective outbound digital message and, based on at least one parameter in the respective profile:

(i) sending the respective outbound digital message to the associated determined destination domain in accordance with the respective profile when permitted by the at least one parameter in the respective profile, or (ii) holding the respective outbound digital message without sending the respective outbound digital message to the determined destination domain when required by the at least one parameter in the respective profile.

12. The system of claim 11, wherein the digital message system comprises a plurality of servers and the server in the plurality of servers that performs the processing of the respective outbound digital message is dynamically determined based on server load in the plurality of servers.

13. A non-transitory computer readable storage medium storing one or more programs configured for execution by a computer, the one or more programs comprising instructions for:

obtaining digital message policy information for a plurality of domains;

determining a digital policy for each respective domain in the plurality of domains, wherein the digital message policy for each respective domain in the plurality of domains dictates a manner in which digital messages are to be sent to the respective domain;

establishing a plurality of profiles wherein each respective profile in the plurality of profiles is for handling digital messages to a corresponding domain in the plurality of destination domains and wherein each respective profile in the plurality of profiles comprises a set of parameters at least one of which is specified by the digital policy of the associated domain;

receiving, after the establishing, a request from a remote computer system to process for transfer a plurality of outbound digital messages, each outbound digital message specifying delivery to at least one recipient at a particular domain; and for a respective outbound digital message in the plurality of outbound digital messages, processing the respective outbound digital message using the digital message system by:

determining a destination domain for the respective outbound digital message reading a respective profile, in the plurality of profiles, associated with the determined destination domain of the respective outbound digital message and, based on at least one parameter in the respective profile:

(i) sending the respective outbound digital message to the associated determined destination domain in accordance with the respective profile when permitted by the at least one parameter in the respective profile, or (ii) holding the respective outbound digital message without sending the respective outbound digital message to the determined destination domain when required by the at least one parameter in the respective profile.

* * * * *